(12) United States Patent
Tran

(10) Patent No.: US 8,433,039 B1
(45) Date of Patent: Apr. 30, 2013

(54) GAMMA-RAY MICROSCOPY METHODS

(75) Inventor: Nathaniel Tue Tran, Artesia, CA (US)

(73) Assignee: PROTEOMYX Inc., Temecula, CA (US)

( * ) Notice: Subject to any disclaimer, the term of this patent is extended or adjusted under 35 U.S.C. 154(b) by 276 days.

(21) Appl. No.: 12/773,005

(22) Filed: May 3, 2010

Related U.S. Application Data

(60) Provisional application No. 61/174,981, filed on May 1, 2009.

(51) Int. Cl.
*G21G 4/00* (2006.01)

(52) U.S. Cl.
USPC ............................................. 378/119; 378/43

(58) Field of Classification Search .................. 378/119, 378/43
See application file for complete search history.

(56) References Cited

U.S. PATENT DOCUMENTS

| | | | |
|---|---|---|---|
| 5,432,349 A | 7/1995 | Wood et al. | |
| 5,887,008 A | 3/1999 | Ikegami | |
| 6,483,118 B2 | 11/2002 | Fujiwara et al. | |
| 6,630,666 B2 | 10/2003 | Greaves | |
| 7,141,790 B2 * | 11/2006 | Koguchi et al. | 250/308 |
| 2003/0202637 A1 * | 10/2003 | Yang | 378/210 |
| 2009/0134344 A1 | 5/2009 | Akers | |

* cited by examiner

*Primary Examiner* — Courtney Thomas

(57) ABSTRACT

This invention teaches a method of performing gamma-ray microscopy and how to build a gamma-ray microscope. While the beam of gamma rays can not be manipulated like a beam of light or a beam of electrons, magnification is possible using a single-point source of gamma radiation. With this design, gamma rays originate from a tiny point in space and radiate outward as they travel away from the source. This results in magnification when a sample is placed between this single-point source and a detector array. The magnification factor is equal to the source-to-detector distance divided by the source-to-sample distance. A single-point source of gamma rays can be made by crossing a beam of positrons with a beam of electrons. The finer and more focused these beams are, the smaller the single-point source can be, and the higher the resolution can be. Methods of making and focusing electron beams are known in the art of making electron microscopy. These methods can be adapted to accelerate and focus positrons into a fine beam. Positrons can be harvested from radioactive isotopes that emit positrons and trapped by electric fields and magnetic fields for use when necessary. Mini versions of particle accelerator can trap positrons in an orbit for regulated or pulsed beam of positrons to be generated.

20 Claims, 4 Drawing Sheets

GAMMA-RAY MICROSCOPY METHODS

CROSS-REFERENCE TO RELATED APPLICATIONS

This application claims priority of provisional patent application U.S. Ser. No. 61,174,981 titled "Gamma-ray Microscopy Methods" filed May 1, 2009.

FIELD OF THE INVENTION

This invention is related to microscopy specifically gamma-ray microscopy and gamma-ray imaging method with magnification and ultra-high resolution for use in the probing molecular structures and sub-molecular structures of matter.

BACKGROUND OF THE INVENTION

Unlike light and electrons, there has not been a method available that can focus or bend gamma rays or their artificial equivalent high energy or hard X-rays controllably for use in microscopy. Light is known to be bendable by traveling through a transparent material of higher refractive index at an angle. Electrons have charges thus the flight path of electrons can be controlled by an electric field or a magnetic field. The shorter the wavelength of the radiation source used, the higher the achievable resolution can be. Gamma rays and X-rays are among the highest energy electromagnetic radiation with the shortest wavelength that can even penetrate dense materials such as lead.

Heisenberg theorized a model gamma-ray microscope that can achieve very high resolution by using high-energy gamma rays for illumination. He envisioned this gamma-ray microscope can be used to probe an electron's position to prove his uncertainty principle. However the lenses in his model can not be made so up until now no such gamma ray microscope exists.

Gamma rays are electromagnetic radiation of high energy. They are produced by sub-atomic particle interactions such as electron-positron annihilation. Gamma rays typically have frequencies above $10^{19}$ Hz or wavelength in the picometer range or smaller.

The short wavelength of gamma rays makes them desirable for use in high resolution probing of sample. According to existing microscopy's principle, the shorter the wavelength, the higher the resolution can be thus enabling higher magnification. This is why an electron microscope can have higher magnification and higher resolution than a light microscope.

The challenge is that since gamma rays can not be controlled in any way except for blocking by heavy shielding, it can only be used for non-magnifying methods of imaging such as Positron Emission Tomography aka PET scan. Similarly, high energy or hard X-rays are used to obtain an image of an object density, but no magnification can be done. As a result, instead of hard X-ray microscopy, X-ray diffraction patterns must be used to deduce the molecular structure of a molecule within a crystal to deduce the structure of molecules within. This is only possible for any molecules that can be crystallized because the repeatable patterns of the same molecule in the crystal are necessary for this method.

SUMMARY OF THE INVENTION

The main object of this invention is to teach a method to perform gamma-ray microcopy using a single-point source of gamma radiation to enable magnification. A sample is placed in close proximity to this single-point source which irradiates gamma rays outward from this point. Gamma rays that pass through the sample can continue traveling and they are detected by a detector array placed at a distance away. As a result, magnification is achieved with a magnification factor equal to the ratio of the source-to-detector distance divided by the source-to-sample distance.

Another object of this invention is to teach a method of achieving a single-point gamma-ray source that emits gamma radiation from a single point in space. This source uses the collision of a positron beam and an electron beam to generate gamma rays at the point of collision. The size of the point-source is controlled by manipulating the size of the positron beam and the size of the electron beam and how they intercept each others. Both of these beams can easily be controlled and focused by electric fields and magnetic fields. The point source of gamma radiation can theoretically be as small as the size of an electron or the size of a positron. This has been projected to be less than 1 femtometer ($10^{-15}$ meter) in diameter.

A further object of the invention is to provide details on how to build a gamma-ray microscope and use it to probe a sample. Positrons can be collected as they are emitted from positron emitting radioactive isotopes and trapped in a special device such as a Penning-Malmberg trap or accelerated and focused to form a positron beam directly as they are emitted. Electrons beams are generated by methods known in the art of making an electron microscope. These technologies allow portable generation of a positron beam and an electron beam that can be focused and crossed at a desirable point to yield a single-point source of gamma radiation. For instance, if the single-point source of gamma radiation is localized at 10 micrometer distance from a sample, and a detector array is placed 10 meters away then an effective one-million-time magnification is possible. If the sensor array can achieve 10 micrometer resolution, then the sample can be probed at 10 picometer resolution.

A further object of the invention is to mobilize the single-point source to different relative positions with respect to the sample to enable three dimensional imaging. Alternatively the sample can be mobilized to achieve similar results. Multiple layers of detectors are used to increase detection efficiency, resolution, and enable tomography mapping. Any gamma rays detected can easily penetrate layers of detector and trigger more than one detection events. Such events can be mapped to trace the gamma rays' path and separate signal from noise.

Additionally, while most gamma rays will pass through the sample unaffected, some will be deflected or bent, and some will be reflected or bounced. A further object of this invention is to provide a means to study deflected and reflected gamma rays from a single-point source using multiple layers of detector array. The layers allow tomography mapping to trace the path of the gamma rays back to its points of origin on a sample. This allow studying of the angle that gamma rays strike the sample and the resulting angle from reflected and deflected gamma rays as well as their correlations. This will provide better understanding of subatomic structures and how different elements can scatter gamma rays differently.

DETAIL DESCRIPTION OF THE INVENTION

Definitions

Figure 1:
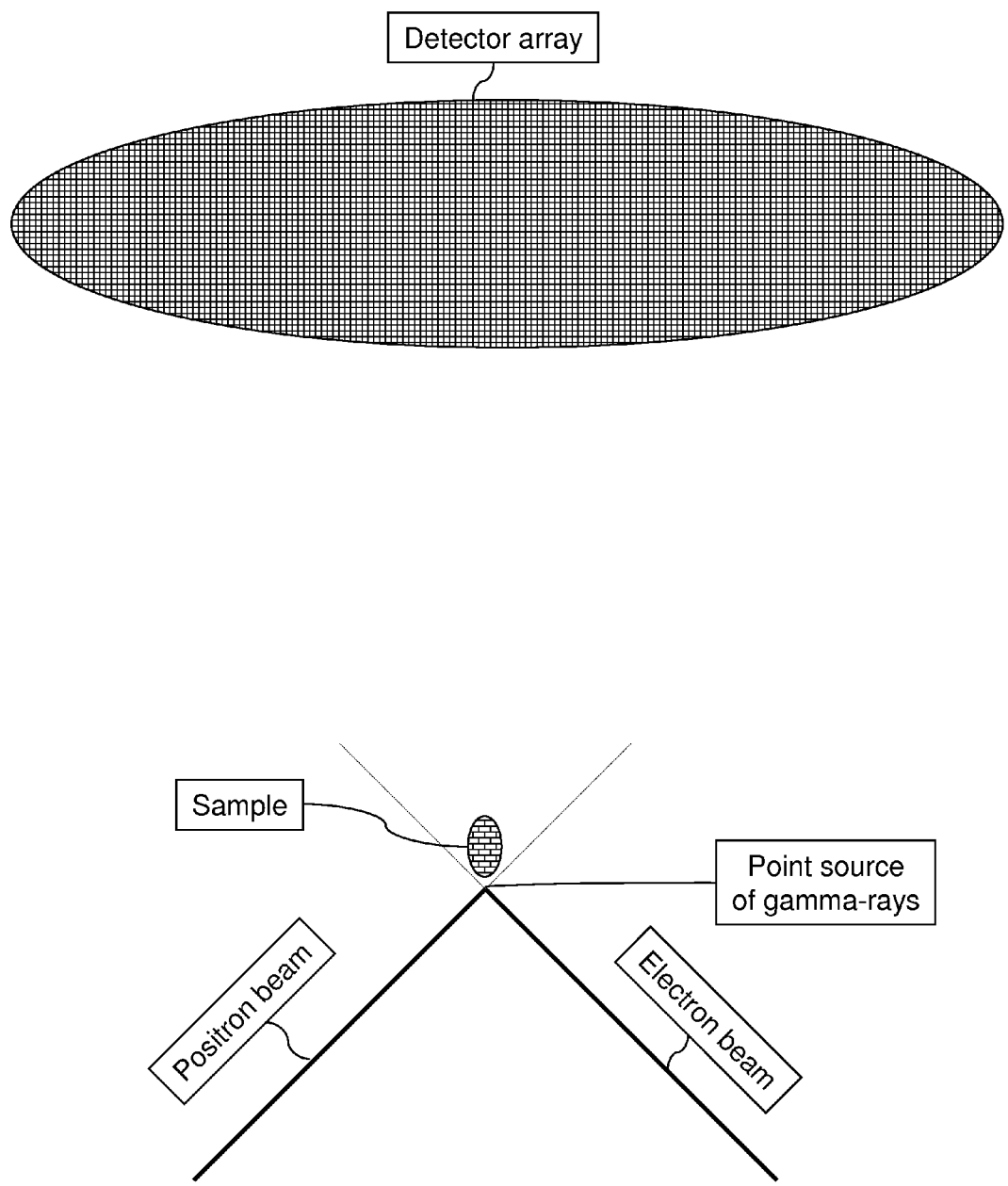
FIG. 1: Illustrates a description of how a gamma-ray microscope is assembled: a single-point source of gamma radiation is generated by crossing a positron beam and an electron beam. A sample is placed at a short distance from this source so that it is between a detector array and the single-point source. The sample is shaped as a thin slice to avoid getting hit by un-reacted electrons or positrons. The electron beam and the positron beam can be turned on individually to destroy any excess part of the sample that is in the path of these beams if necessary. It is also possible to have the electron beam and the positron beam in the same plane, but not the sample. This allows the sample to be placed very close to the source without getting struck by un-reacted positrons or electrons from the beam.
Figure 2:
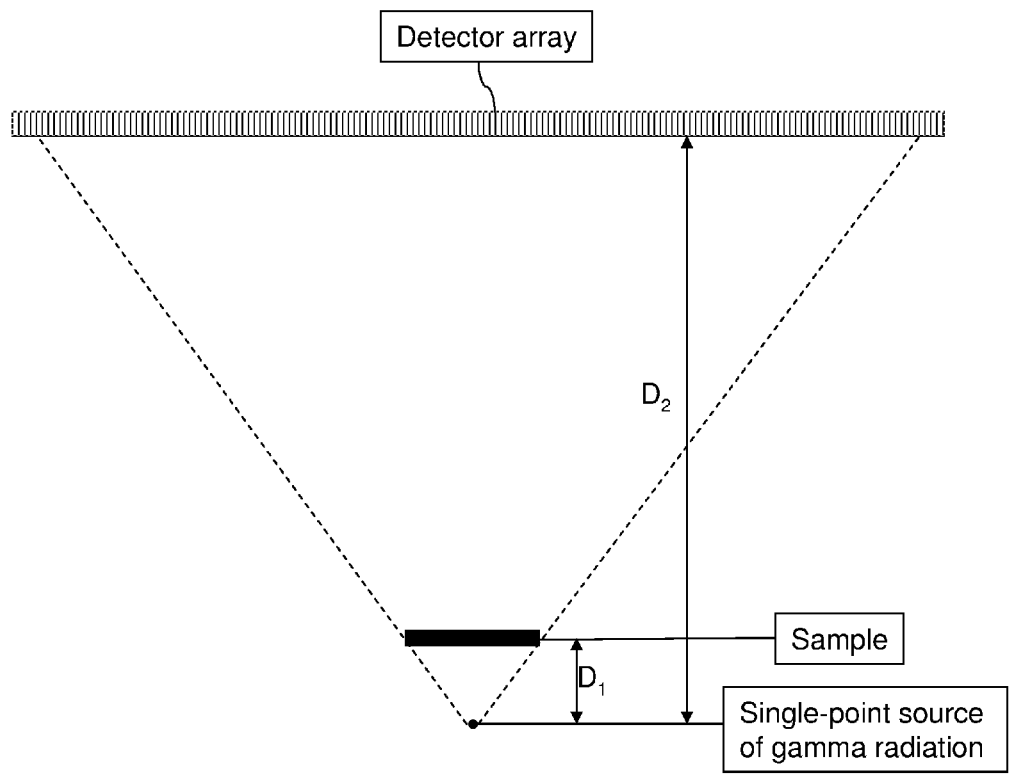
FIG. 2: Illustrates how a gamma-ray microscope works. Gamma radiation is emitted from a single point source and irradiates outward from this point. The ratio ($D_2$:$D_1$) of the distance between the single-point source and the detector ($D_2$) to the distance between the single point source and the sample ($D_1$) is the magnification factor. Accordingly, the smaller the single point source is, the higher the resolution can be in addition to wavelength resolution limitation.
Figure 3:
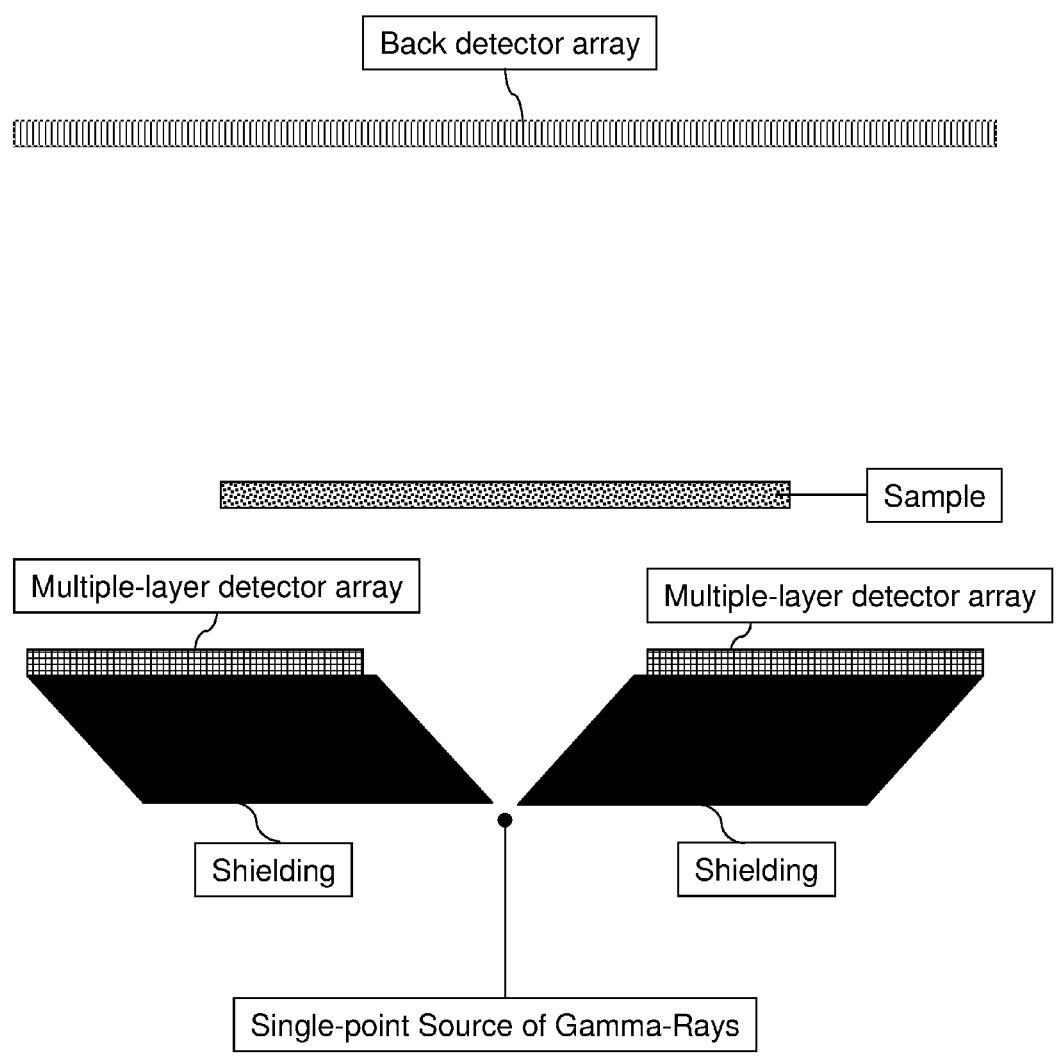
FIG. 3: Illustrates how reflected gamma rays can be studied using a single-point source of gamma rays to map exactly how gamma rays interact with the sample. The detector arrays are shielded from the point source to enable analysis. These detector arrays have multiple layers to map the exact path of any gamma rays detected by the same process used in PET scanning. This path allows back tracing of the gamma ray to a point of origin on the sample. This point of origin is also most likely the point that a gamma ray from the point source has hit allowing all the paths to be known. The back detector array is used to determine the amount of gamma rays passing through so that the percentage of gamma rays reflected can be calculated.
Figure 4:
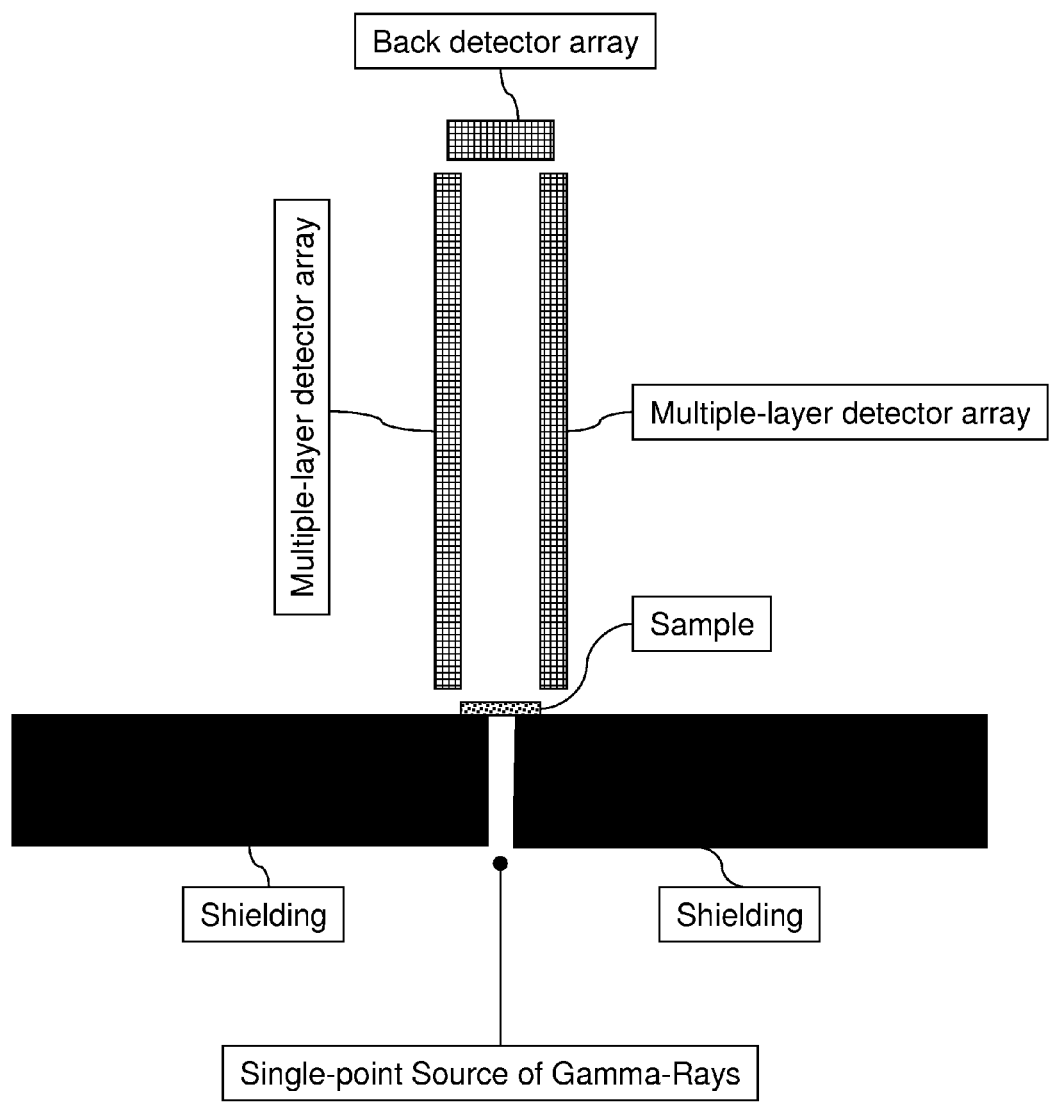
FIG. 4: Illustrates how deflected or bent gamma rays can be studied using a single-point source of gamma rays. The exact path that a gamma-ray travel to hit the detector array can be determined with this set up. The back detector array is used to determine the amount of gamma rays passing through so that the percentage of gamma rays deflected can be calculated.

Deflected or bent here is defined as changing the path such as that of gamma rays but not by more than 90°.
Reflected or bounced here is defined as changing the path such as that of gamma rays by more than 90°.
Point source is defined as a source with the size sufficiently small. For the purpose of analysis here the point source should have a size equal to or smaller than the desirable resolution. Single-point source is used to emphasize that every thing come from one single point.

Methodology:

Since gamma rays propagation can not be manipulated yet to make a gamma ray microscope, we devise an alternative design that will yield the desirable magnification. When a single-point gamma radiation source that irradiate gamma rays outward only from this point is placed in front of a sample, and a gamma ray detector array is placed behind the sample (in relation to this source) the result is that the detector can detect gamma rays that travel through the sample as a magnified picture. Since the single-point source irradiates gamma rays outward in all directions, the beam naturally magnify and become bigger as it is measured further away from the source. The same principle applies to the beam (portion) of gamma rays that passes through the sample; it is magnified into a larger beam as it gets further away from its source. If the sample blocks a part of the beam, or bend a part of the beam, then these actions would be magnified as the beam travel further away from the source. For instance, if the sample is placed just one hundred micrometers away from the single-point source of emission and the detector array is placed one hundred meters behind the sample, then the magnification factor is equal to the distance between the source and the detector divided by the distance between the source and the sample or (1,000,000+1)/1=1,000,001 times. As a result, while gamma rays can not be focused, it is possible to use them for microscopy application according to this method.

Typically, a detector is placed behind a sample with relative to the gamma-ray source. However, additional information can be gained by observing gamma rays that are bent or deflected by the sample thus other detectors all around the areas may be desirable. For instance, gamma rays have been known to bounce back when hitting a nucleus of an atom, thus a detector on the opposite side may pick this up as signal above the normal amount generated by the single-point source. If the source can generate gamma rays evenly in all direction then any increase in signal at any location can be readily detectable.

Sourcing Gamma Rays:

We know that gamma rays can be generated when a positron annihilate an electron. So if we can control where the positron comes into contact with the electron, the position where gamma radiation originated can be defined. Furthermore, we want this position to be as small as possible down to a tiny point in space because the resolution of this imaging method depends on it. It is possible to generate and focus an electron beam as described in electron microscopy. A typical 200 kV electron microscope can have an electron beam with the wavelength of 2.5 picometer and can be focused with electric field lenses. Similarly a positron beam can be accelerated and focused to collide with an electron beam at a defined point in space. A 2.5 picometer round beam intercepting another 2.5 picometer round beam, at a perpendicular angle will have an interception point the size of a sphere with a diameter of 2.5 picometer. This is the simplest way of generating a point source of gamma rays; however, multiple beams can be used for improving and manipulating the source if necessary.

One necessary feature for this type of source is the ability to manipulate both the positron beam and the electron beam in effect to tune the microscope. In addition to positioning the beam relative to the sample where the beam can be moved or the sample can be moved, the sizes and shapes of each beam can be changed. The directions of each beam can be manipulated to adjust how they intercept each others.

Positrons are not naturally abundant in this part of the universe as electrons, thus a source for producing them is needed. Radioactive isotopes that emit positrons can be used as a portable source. Naturally these isotopes will emit positrons in all directions. When any of the positrons come into contact with a molecule, the positrons will annihilate equal amount of electrons on that molecule and generate gamma rays. Instead of this natural loss, positrons can be diverted using electric field and magnetic field. These positrons can be accelerated and focused into a narrow beam for collision with an electron beam as they are generated. Alternatively, these positrons can be trapped and stored for use when needed. A method of trapping and storing positrons is taught by U.S. Pat. No. 6,630,666 the content of which is incorporated herein by reference. This allows various modes of operation such as continuous mode vs. pulse mode for the gamma ray microscope.

Positrons can be sourced from radioactive isotopes that emit positrons such as sodium-22. Many such isotopes are known to those skilled-in-the art and can be selected depending on availability and cost. Other artificial sources can also be used such as positrons produced by high energy collision involving a particle beam. One such method is taught by U.S. Pat. No. 6,483,118 the content of which is incorporated herein by reference.

It is also possible to source and store positrons using one apparatus such as the one taught by published US patent application No. 2009/0134344 the content of which is incorporated herein by reference. Briefly this method use photons to strike matter that are known to emit positrons when struck with photons wherein said matter is placed within a positron trapping apparatus.

The electron beam and positron beam used to generate the point source of gamma radiation can be controlled to produce coherent source of gamma radiation if necessary. One can use a method similar to the method taught by U.S. Pat. No. 5,887,008 the content of which is incorporated herein by reference.

It is also possible to generate gamma rays at higher energy with shorter wavelength like cosmic rays by colliding accelerated sub-atomic particles. This is an alternative approach to getting ever shorter wavelength for ever increasing magnification. The subatomic particles can also be focused and controlled for collision at a single point in space. This is commonly done in a particle accelerator.

It is also possible to generate a point source of X-rays however the point can not be as small. X-rays is generated by accelerating electrons smashing into a target. Accordingly, a beam of electrons can strike the tip of a needle as small as one single molecule and generate X-rays at this tip. While this is possible, the tip of the needle will vaporize eventually under this high kinetic collision. Another problem is that the point source has to be placed as close to the sample as possible for maximum magnification. When the sample is too close, these electrons may strike the sample as well. However, for lower resolution and lower magnification, X-rays can be used as substitution for gamma rays in this invention. Other types of rays including electromagnetic radiation can also be used with this method to avoid the need of any focusing lenses.

Detection:

The method of detecting gamma rays and other high energy rays are known by those skilled in the arts. A gamma ray detector array can be constructed of many photomultiplier tubes or photodiodes. Since gamma rays can penetrate several layers of detectors, it is best to have at least a few layers. Such detectors have been made for use in a Positron Emission Tomography or PET scanning instrument. Some have also been made for gamma-ray telescope and detector arrays used in a particle accelerator. Then a process similar to coincident counting can be used to eliminate noise. Briefly, if a detector in front detects a signal, then one of the detectors behind it should have detected a signal within a certain time frame for the signal to be counted; or else the signal is considered noise and is discarded. This will eliminate most of the noises generated by these highly sensitive detectors.

Alignment:

Typically, gamma rays form by annihilation of a positron and an electron can be emitted randomly in any direction so the sample can be placed in any position in close proximity to the point source. However, the use of fine beam of electrons and positrons necessitate these particles to be accelerated to high speed. Thus most resulting gamma rays will inherit at least some of the momentum from their parent particles (positrons and electrons). With reference to FIG. 1, most resulting gamma rays will travel upward toward the top quadrant. For maximum efficiency, it is best to place the sample on the imaginary center line dividing this quadrant into two equal parts.

It is desirable to have a positron beam and an electron beam intercepting each other at a perpendicular angle to generate the smallest and most symmetrical point source possible. However, when such alignment is impractical such as in the case when the sample needs to be really close to the source, these beams can be crossed at a different angle or on a different plane completely. For instance two electron beams can be crossed with one positron beam at 120 degree. If the point source is not spherical in shape, then adjustment can be made at the detection end to compensate for the imaging process. Manipulating the shapes of the point source may yield some interesting findings. The source can be continuous or pulse depending on needs.

Sample:

It is desirable to place the sample as close to the point source of gamma radiation as possible. Because of inherited momentum, more gamma rays will travel in one direction thus it is desirable to place the sample accordingly to get the maximum exposure. To do so, the sample needs to be shaped like a thin wire to keep the electron beam and the positron beam from hitting it. Such thin wire can be held between two needle points that can also provide the necessary cooling. Alternatively, the sample can be spread out like a pancake held by multiple points, and a beam such as laser is used to cut a first hole through the sample using the path of the positron beam and second hole through the sample using the path of the electron beam. The positron beam or electron beam itself may be able to do the cutting when turned on individually if it does not destroy the sample in the process. The purpose of creating these holes is for un-reacted positrons and electrons to escape without generating undesirable gamma rays or X-rays.

Miscellaneous:

It is possible to determine the shape and size of the point source using the method taught in U.S. Pat. No. 5,432,349 the content of which is incorporated herein by reference. By determining the size of the source, one can experimentally determine the upper limit of the size of an electron or its antimatter equivalent the positron. This is because the source can't be smaller than an electron or a positron, thus an electron or positron must be equal to or smaller than the size of the source.

Since positrons are harder to get, it is desirable to use excess amount of electrons compared to the amount of positrons in the corresponding beams. Un-reacted positrons are those that fail to turn into gamma rays via annihilation reaction with electrons. These un-reacted positrons can produce gamma rays elsewhere if they come into contact with mater or just electrons. As a result, the path for un-reacted positrons should be clear and then they can be reacted with electrons in a well shielded area or recycled back into the trap.

Detector arrays should be shielded from all unwanted sources of radiation that can trigger a detection event when possible. Detectors that are exposed to the source of radiation directly can determine the radiation intensity and distribution. Gamma rays can travel long distance in air and especially in vacuum, thus there is little limit to how far away the detector array can be.

Scattering:

While a detector array placed behind a sample with respect to a single-point source is expected for microscopy, not all of the gamma rays that come into contact with the sample will pass through the sample. In theory, gamma rays get deflected or bent (slight change in direction) after striking electrons.

The same theory suggests that gamma rays get reflected or bounced back when striking atomic nuclei. If the theory holds, then scattering can provide useful information such as atomic nuclei's sizes . . . yielding composition of matter. The single-point source scattering allow one to map the exact path that gamma rays travel. Using multilayer detector arrays, topographic information can be obtained to back trace any detected gamma rays to its point of emission. From there it is traced back to the single-point source origin. This makes possible the study of angle of incident, deflection, and reflection. Care should be taken to shield the detectors in use from the point source itself or any other sources of radiation not coming from the sample.

DESCRIPTION OF THE PREFERRED EMBODIMENT

At the heart of the gamma ray microscope is a single-point source of gamma radiation that irradiate outward from a single point in space. A focused and narrow beam of electrons is used to intercept a focused and narrow beam of positrons at a single point in space to create this single-point gamma radiation source. The preferred angle for interception is 90 degree, and the point of interception should be as symmetrical as possible. Multiple beams of electrons and positrons may be needed to achieve this symmetry. Because electrons and positrons are charged particles, they can be focused, accelerated, diverted easily. While electrons are naturally abundant in this part of the universe, positrons are very rare and need to be sourced in a special way. One way to get positrons is by capturing them from radioactive decay of positive beta emitters such as Sodium-22, and Flourine-18 . . . . These positrons can be diverted into a beam directly or trapped and stored first.

A sample holder to hold the sample is placed in close proximity to where the point source is when the beams are turned on. The holder should also provide cooling to the sample if necessary to keep molecular agitation to a minimum. Additionally, the sample holder can move the sample around or rotate in various axes so that the sample can be viewed in 3-D. The sample itself should be small enough to avoid getting struck by un-reacted positrons or electrons. Alternatively, simple way to trim the sample is by simply turning on just the positron beam, and then just the electron beam to vaporize any excess parts or at least to check to see if the beam will react with the sample.

There are three possibilities when gamma rays come into contact with a sample. Gamma rays can go right through, be bent or deflected and slightly change direction, or be bounced or reflected in almost the opposite direction. Accordingly, sensor arrays for detecting all these events should be available when possible. To detect gamma rays that have come into contact with the sample, the detectors' lines of sight to all other sources of radiation should be shielded leaving open only the path to the sample.

I claim:

1. A method of producing a sub-micron single-point source of radiation comprising the step of: crossing a beam of a first subatomic particles with a beam of a second subatomic particles whereas the intersection of both beams is smaller than one micron in diameter.

2. The method of claim 1 further comprises the steps of:
   a) exposing a sample to radiation from said sub-micron single-point source of radiation; and,
   b) detecting radiation that has come into contact or come in close proximity with said sample.

3. The method of claim 2 wherein a magnified image of radiation passing through said sample is obtained.

4. The method of claim 2 wherein a magnified image of radiation deflected by said sample is obtained.

5. The method of claim 2 wherein a magnified image of radiation bounced or reflected by said sample is obtained.

6. The method of claim 2 wherein said first subatomic particles are electrons and said second subatomic particles are protons.

7. The method of claim 2 wherein said first subatomic particles are electrons and said second subatomic particles are positrons.

8. The method of claim 7 wherein a magnified image of radiation passing through said sample is obtained.

9. The method of claim 7 wherein a magnified image of radiation deflected by said sample is obtained.

10. The method of claim 7 wherein a magnified image of radiation reflected or bounced by said sample is obtained.

11. The method of claim 7 wherein said sub-micron single-point source of radiation also has the source's diameter not longer than one thousand times the wavelength of the radiation generated.

12. A method of analysis comprises the steps of:
    a) producing a sub-micron single-point source of radiation by crossing a beam of subatomic particles with a beam of molecules whereas the intersection of both beams is smaller than one micron in diameter;
    b) exposing a sample to radiation from said sub-micron single-point source of radiation; and,
    c) detecting radiation that has come into contact or come in close proximity with said sample.

13. The method of claim 12 wherein said subatomic particles are positrons.

14. The method of claim 12 wherein said subatomic particles are electrons.

15. The method of claim 14 wherein a magnified image of radiation passing through said sample is obtained.

16. The method of claim 14 wherein a magnified image of radiation deflected by said sample is obtained.

17. The method of claim 14 wherein a magnified image of radiation bounced or reflected by said sample is obtained.

18. A microscopy method without the need for lenses or mirror comprises the steps of:
    a) producing a single-point source of radiation by crossing a beam of a first subatomic particles with a beam of a second subatomic particles or molecules whereas the intersection's diameter of both beams is not longer than a desirable microscopy resolution;
    b) exposing a sample to radiation from said single-point source of radiation; and,
    c) detecting radiation that has come into contact or come in close proximity with said sample.

19. The method of claim 18 wherein at least one magnified image of radiation that has come into contact with said sample is obtained.

20. The method of claim 18 wherein at least one magnified image of radiation that has come in close proximity with said sample is obtained.

* * * * *